United States Patent
Daniell et al.

(10) Patent No.: US 7,916,853 B2
(45) Date of Patent: Mar. 29, 2011

(54) METHODS, SYSTEMS, AND COMPUTER PROGRAM PRODUCTS FOR PROVIDING CALENDAR BASED ROUTINGS OF COMMUNICATIONS

(75) Inventors: William Daniell, Kennesaw, GA (US); Marty Smith, Atlanta, GA (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 1499 days.

(21) Appl. No.: 11/313,026

(22) Filed: Dec. 19, 2005

(65) Prior Publication Data
US 2007/0140458 A1 Jun. 21, 2007

(51) Int. Cl.
*H04M 7/00* (2006.01)
(52) U.S. Cl. ......... 379/221.01; 379/211.01; 379/211.02; 379/273; 379/201.1; 379/207.12; 709/239; 709/242; 455/445; 455/417
(58) Field of Classification Search .................. 709/204, 709/223; 455/567, 446; 379/221.01, 142.01, 379/373.02, 201.01
See application file for complete search history.

(56) References Cited

U.S. PATENT DOCUMENTS

| | | | |
|---|---|---|---|
| 6,075,841 A * | 6/2000 | Engelke et al. | 379/52 |
| 6,373,817 B1 * | 4/2002 | Kung et al. | 370/217 |
| 6,611,590 B1 * | 8/2003 | Lu et al. | 379/265.09 |
| 6,839,410 B2 * | 1/2005 | Infosino | 379/88.02 |
| 7,248,900 B2 * | 7/2007 | Deeds | 455/567 |
| 7,317,919 B1 * | 1/2008 | Ruf | 455/446 |
| 2004/0034700 A1 * | 2/2004 | Polcyn | 709/223 |
| 2005/0031102 A1 * | 2/2005 | Kraus et al. | 379/114.2 |
| 2005/0135595 A1 * | 6/2005 | Bushey et al. | 379/265.01 |
| 2005/0169443 A1 * | 8/2005 | Rosenthal | 379/88.17 |
| 2006/0177030 A1 * | 8/2006 | Rajagopalan et al. | 379/142.07 |
| 2007/0124371 A1 * | 5/2007 | Desai et al. | 709/204 |

* cited by examiner

*Primary Examiner* — Curtis Kuntz
*Assistant Examiner* — Joseph J Nguyen
(74) *Attorney, Agent, or Firm* — Cantor Colburn LLP

(57) ABSTRACT

Methods, systems, and computer program products for providing calendar based routing of communications. Methods include receiving a communication from a sending party to a receiving party, the communication including a communication type. A current calendar entry type for the receiving party is retrieved in response to receiving the communication. A destination for the communication is determined. The destination is responsive to the communication type and to the current calendar entry type. The communication is transmitted to the destination.

19 Claims, 3 Drawing Sheets

| RECEIVING PARTY IDENTIFIER 202 | CALENDAR ENTRY TYPE 204 | COMMUNICATION TYPE 206 | NOTIFICATION MODE 208 | TARGET DESTINATION 210 |
|---|---|---|---|---|
| ABC | MEETING-BUSINESS | TEXT | VIBRATE | MOBILE PHONE |
| ABC | MEETING-BUSINESS | VOICE | VIBRATE | MOBILE PHONE |
| ABC | ... | ... | ... | ... |
| ABC | AWAY-VACATION | TEXT | NONE | E-MAIL INBOX |
| ABC | AWAY-VACATION | VOICE | NONE | VOICE-MAIL |
| ABC | GENERAL TASK | TEXT | BEEP | INSTANT MESSAGE |
| ABC | GENERAL TASK | VOICE | RING | WORK PHONE |

FIG. 2

METHODS, SYSTEMS, AND COMPUTER PROGRAM PRODUCTS FOR PROVIDING CALENDAR BASED ROUTINGS OF COMMUNICATIONS

BACKGROUND

Exemplary embodiments relate generally to routing communications, and more particularly, to methods, systems and computer program products for providing calendar based routings of communications.

Application programs for routing incoming text and voice messages to specified destinations are commercially available. Typically, individuals have many locations and modes by which they may be contacted. For example, an individual may have a land-based telephone utilized while in the office, a mobile telephone for use while traveling or not in the office, an e-mail account, a voice mail account and an instant messaging account. It has become increasingly time consuming to check the various possible communication destinations for messages in order to not to miss any incoming messages. The person initiating the communication may have no way of knowing the location and mode(s) that the receiving party is currently monitoring for messages. It would be desirable for the sender of the communication to be able to send the communication to the current location of the receiving party in the current mode(s) being monitored by the receiving party.

Commercially available calendaring applications provide information about the current location of an individual. Calendaring applications may also provide information about the kind of task (e.g., meeting and vacation) currently being performed by the individual. It would be desirable to be able to utilize the information contained in the calendaring application to route incoming communications to the receiving party. This would benefit both the sending party by allowing the communication to be sent to a destination likely to be currently monitored by the receiving party. This would also benefit the receiving party by cutting down on the number of destinations to be monitored for incoming communications.

SUMMARY

Exemplary embodiments relate to methods, systems, and computer program products for providing calendar based routing of communications. Methods include receiving a communication from a sending party to a receiving party, the communication including a communication type. A current calendar entry type for the receiving party is retrieved in response to receiving the communication. A destination for the communication is determined. The destination is responsive to the communication type and to the current calendar entry type. The communication is transmitted to the destination.

Systems for providing calendar based routing of communications include a processor in communication with a network. The system also includes computer instructions executing on the processor for facilitating receiving a communication via a network from a sending party to a receiving party. The communication includes a communication type. A current calendar entry type for the receiving party is retrieved in response to receiving the communication. A destination for the communication is determined. The destination is responsive to the communication type and to the current calendar entry type. The communication is transmitted to the destination via the network.

Computer program products for providing calendar based routing of communications include a storage medium readable by a processing circuit and storing instructions for execution by the processing circuit for facilitating a method. The method includes receiving a communication from a sending party to a receiving party, the communication including a communication type. A current calendar entry type for the receiving party is retrieved in response to receiving the communication. A destination for the communication is determined. The destination is responsive to the communication type and to the current calendar entry type. The communication is transmitted to the destination.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 2 is a block diagram of an exemplary table for providing calendar based routing of communications.

DETAILED DESCRIPTION OF EXEMPLARY EMBODIMENTS

Figure 1:
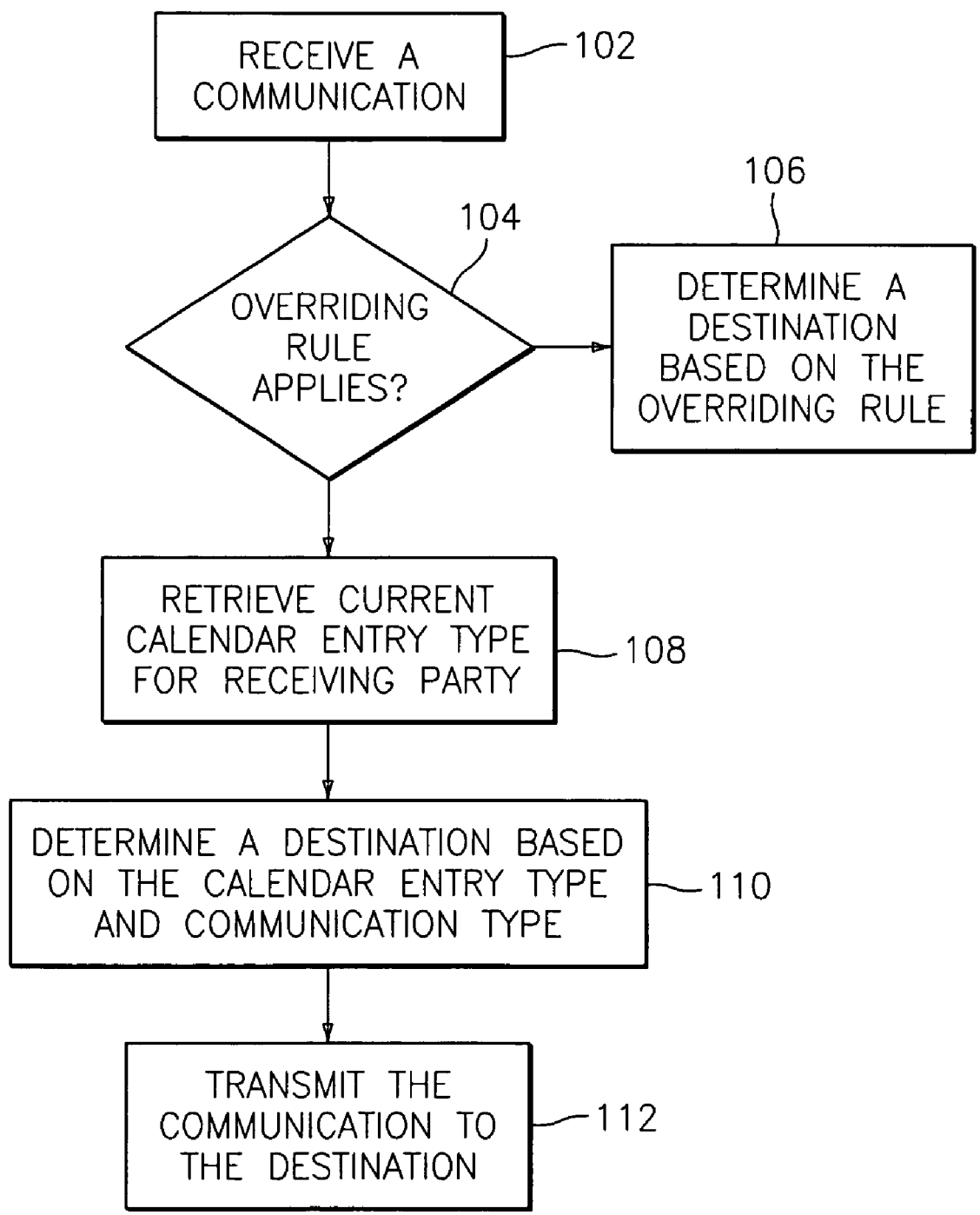
FIG. 1 is a flow diagram of an exemplary process for providing calendar based routing of communications.

FIG. 1 is a flow diagram of an exemplary process for providing calendar based routing of communications. In exemplary embodiments, the processing depicted in FIG. 1 is facilitated by computer instructions located on a host system. At block 102, a communication is received (e.g, at the host system, via a network) from a sending party. The communication includes a communication type (e.g., voice, text) and is received by a receiving party. Examples of communications include, but are not limited to: telephone calls, instant messages, and e-mail. The sending party may be initiating the communication in any manner including, but not limited to: at a telephone (e.g., land-based and mobile) or at a user device such as personal computer. In exemplary embodiments, if the communication type is voice, then the communication is voice over Internet protocol (VOIP) which is terminated at a host system via an analog terminator trigger. When the analog termination occurs using a VOIP server, the VOIP server digitizes and encodes the audio signal using a standard audio encoding method. The standard method typically used is defined in the G.711 or G.729 standards documentation found at the IETF standards committee. Once digitized, the audio is then transmitted as digital data and decoded at the user's device. The digital audio packets can be routed based upon the network routing rules outlined in this patent.

At block 104, a check is made to determine if an overriding rule applies to communications from the sending party. If it is determined, at block 104, that an overriding rule applies, then block 106 is performed. At block 106, the communication is routed to the destination specified by the overriding rule. For example, an overriding rule may specify that all telephone calls (e.g., voice communications) from sending party "S" are to be routed to the receiving party's mobile phone voice mailbox. In this example, the destination is the receiving party's mobile telephone voice mailbox. The overriding rule may also specify a notification mode for the communication. For example, the overriding rule may specify that all telephone calls from sending party "S" are to be routed to the receiving party's mobile telephone and that the receiving party should be notified with a particular ring tone. The destination in this example is the receiving party's mobile telephone and the notification mode is the particular ring tone. The receiving party may set up none, one, or a plurality of overriding rules based on a sending party identifier (e.g., telephone number and/or computer userid) and optionally on the communication type.

If it is determined, at block 104, that an overriding rule does not apply, then block 108 is performed. At block 108, a current calendar entry type for the receiving party is retrieved. In exemplary embodiments, the current calendar entry type is retrieved by transmitting a request to a calendaring system utilized by the receiving party (e.g., Microsoft Outlook) utilized by the receiving party. The request includes an identifier of the receiving party (e.g., userid). In exemplary embodiments, the request is transmitted immediately upon receiving the communication and the time stamp (date and time) associated with the request is utilized by the calendaring system to retrieve a current calendar entry type for the current date and time.

In exemplary embodiments, depending on the type of calendaring system, the calendar entry for the current date and time has an associated calendar entry type specified. This current calendar entry type is then returned in response to the request. In other exemplary embodiments, the current calendar entry type is determined by the processor based on keywords located in a description associated with an entry for the receiving party for the current date and time in the calendaring system. These keywords may be created by the receiving party and stored in the table described below in reference to FIG. 2.

At block 110, a destination for the communication is determined based on the current calendar entry type and the communication type. A table, such as the one depicted in FIG. 2, is accessed to look up a destination associated with the current calendar entry type and the communication type. Destinations include, but are not limited to user devices such as: a pager, a mobile telephone, a voice mailbox, a land based telephone, an e-mailbox and a user interface screen on a user device (e.g. personal computer screen and personal data assistant screen). In exemplary embodiments, the receiving party has set up a default destination to be utilized if the current calendar entry type and communication type are not located in the table. The default destination may be the same for both voice and text messages or it may be different for voice and text messages. In exemplary embodiments, the table depicted in FIG. 2 does not differentiate the target destinations for every calendar entry type based on the communication type. One or more of the calendar entry types specify the same target destination for any type of communication (e.g., voice or text).

In exemplary embodiments, the table depicted in FIG. 2 also includes a notification mode associated with the current calendar entry type and the communication type. The communication notification mode specifies how the receiving party should be alerted and includes, but is not limited to one or more of: an audio alert; a visual alert, and a haptic alert. An audio alert may include, but is not limited to: a ring tone, a beep, and a particular ring tone. The audio alert may also specify a particular volume for the alert. A visual alert may include a display on a screen located on a mobile telephone, a personal computer and/or a pager. Haptic alerts may include, but are not limited to vibrating a pager or mobile telephone.

At block 112 in FIG. 1, the communication is transmitted to the destination determined at block 110. In exemplary embodiments, the communication is transmitted via the network to a user device (e.g., a personal computer, and a mobile telephone) which in some cases may be implemented as a storage location (e.g., voice mailbox, and e-mailbox).

FIG. 2 is a block diagram of an exemplary table for providing calendar based routing of communications. In exemplary embodiments, a default table is provided (e.g., with calendar entry types in the calendaring system). The default table may be modified by the receiving party. The table depicted in FIG. 2 includes a receiving party identifier column 202, a calendar entry type column 204, a communication type column 206, a notification mode column 208, and a target destination column 210. The table depicted in FIG. 2 includes entries only for a receiving party identified as "ABC", in alternate exemplary embodiments, a single table includes entries for multiple receiving party identifiers. Calendar entry types in the calendar entry type column 204 may include, but are not limited to: meeting-business, meeting-non-business, away-vacation, away-conference, away-business, doctor appointment, in the office, general (e.g., in office performing a task).

The calendar entry types may be tailored to the receiving party and updated by the receiving party. As described previously, the communication type in the communication type column 206 may include any type of communication such as voice and text. Also as described previously, the notification mode in the notification mode column 208 can be an audio alert, a haptic alert and/or a visual alert. The target destination in the target destination column 210 may include, but is not limited to one or more of: a voice mailbox, a mobile (e.g., cellular) telephone, a land based telephone, a pager, an instant messaging screen, and an e-mailbox. In exemplary embodiments, the target destination column 210 specifies phone numbers and/or computer addresses. In alternate exemplary embodiments, the target destination column 210 specifies the type of destination (e.g., "mobile telephone") and another table is accessed to retrieve the actual phone numbers and/or computer addresses.

The table depicted in FIG. 2 is meant to be exemplary in nature. Other table configurations may be utilized by exemplary embodiments to facilitate the processing performed herein.

Figure 3:
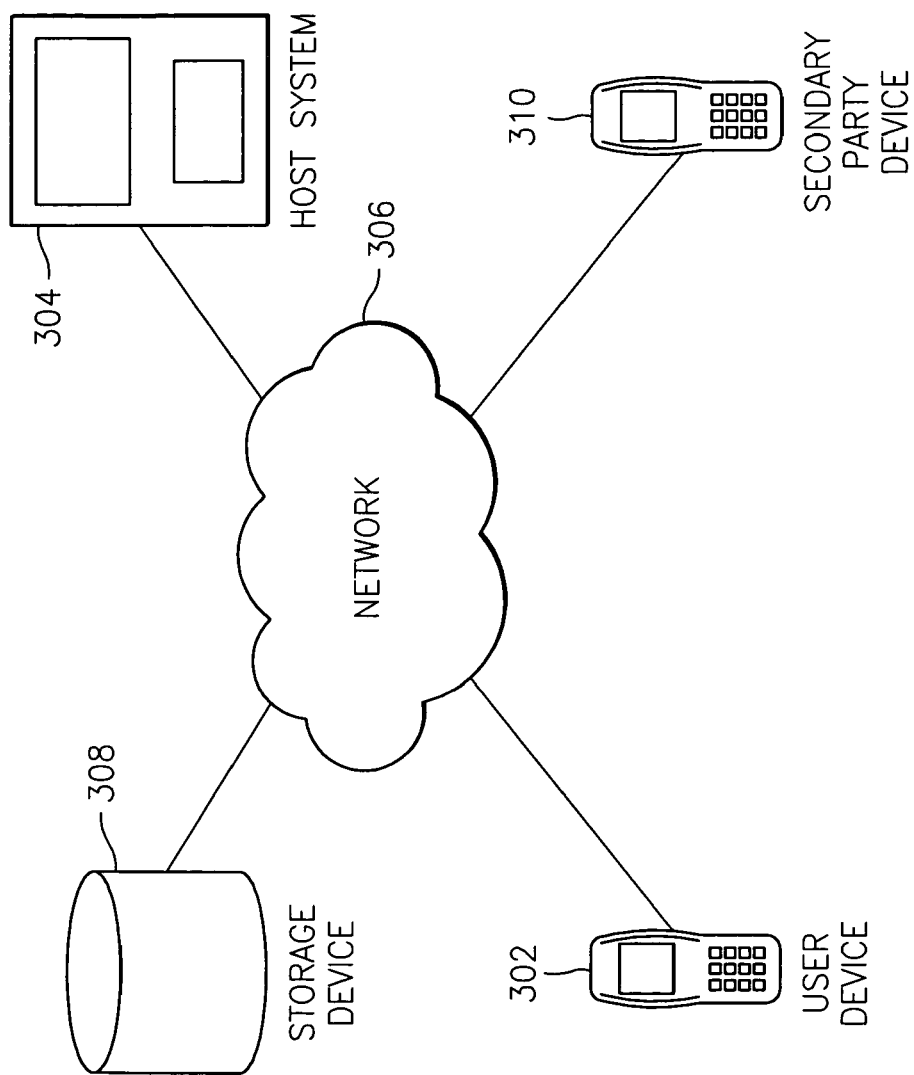
FIG. 3 is a block diagram of a system that may be utilized to provide calendar based routing of communications.

FIG. 3 is a block diagram of a system that may be utilized to provide calendar based routing of communications in accordance with exemplary embodiments. The system includes one or more sending party devices 310 through which sending parties at one or more geographic locations may initiate a communication to a receiving party. The system also includes one or more user devices 302 through which receiving parties may receive a communication from a sending party. In exemplary embodiments, the host system 304 executes the calendar based routing application to perform the functions described herein. The calendar based routing application may be implemented by software and/or hardware components. In alternate exemplary embodiments, the calendar based routing application described herein is built on top of an existing calendaring program or system (e.g., Microsoft Outlook) and an existing communication routing system. For example, the system can be built using a Microsoft Exchange server's Critical Path Calendar server, or any other calendar server where the calendar event information can be stored and classified. The calendar routing server uses the event information/classifications to compare to the rules stored in it's database. When the calendar routing server is called by other routing services (e.g., VOIP servers, E-mail SMTP/IMAP4 servers, instant messaging servers, etc.), it uses the local rules database and compares it to the calendar event classifications. The calendar routing server then commands the media servers to route the information based upon the rule(s) that matches the event classification (similar to the table outlined in FIG. 2).

In exemplary embodiments, the user devices 302 and sending party devices 310 are coupled to the host system 304 via a network 306. Each user device 302 may be implemented using a general-purpose computer executing a computer program for carrying out the processes described herein. The user devices 302 may be personal computers, lap top computers, personal digital assistants, pagers, cellular telephones, storage locations, host attached terminals, etc. with user interfaces for communicating with the calendar based routing application. The user interfaces may be implemented by interface screens, audio technology, voice recognition technology, or any other technology to allow the calendar based routing application to communicate with the user device 302. If the user devices 302 are personal computers (or include the required functionality), the processing described herein may be shared by a user device 302 and the host system 304 (e.g., by providing an applet to the user device 302) or contained completely within one or more of the user devices 302.

The network 306 may be any type of known network including, but not limited to, a wide area network (WAN), a local area network (LAN), a global network (e.g. Internet), a virtual private network (VPN), and an intranet. The network 306 may be implemented using a wireless network or any kind of physical network implementation. A user device 302 may be coupled to the host system 304 through multiple networks (e.g., intranet and Internet) so that not all user devices 302 are coupled to the host system 304 through the same network. One or more of the user devices 302 and the host system 304 may be connected to the network 306 in a wireless fashion.

The storage device 308 may be implemented using a variety of devices for storing electronic information. It is understood that the storage device 308 may be implemented using memory contained in the host system 304 or the user device 302 or it may be a separate physical device. The storage device 308 is logically addressable as a consolidated data source across a distributed environment that includes a network 306. Information stored in the storage device 308 may be retrieved and manipulated via the host system 304. The storage device 308 may include data such as the table depicted in FIG. 2, overriding rules, a voice mailbox, and an e-mailbox. Portions or all of the records may be located on electronic business cards such as VCards. These electronic business cards may be utilized to implement all or portions of the storage device 308. The storage device 308 may also include other kinds of data such as administrative information utilized by the calendar based routing application. In exemplary embodiments, the host system 304 operates as a database server and coordinates access to application data including data stored on storage device 308.

The host system 304 depicted in FIG. 3 may be implemented using one or more servers operating in response to a computer program stored in a storage medium accessible by the server. The host system 304 may operate as a network server (e.g., a web server) to communicate with the user device 302. The host system 304 handles sending and receiving information to and from the user device 302 and can perform associated tasks. The host system 304 may also include a firewall to prevent unauthorized access to the host system 304 and enforce any limitations on authorized access. For instance, an administrator may have access to the entire system and have authority to modify portions of the system. A firewall may be implemented using conventional hardware and/or software.

The host system 304 may also operate as an application server. The processor in the host system 304 executes one or more computer programs to implement the calendar based routing application. Processing may be shared by the user device 302 and the host system 304 by providing an application (e.g., java applet) to the user device 302. Alternatively, the user device 302 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

As described above, exemplary embodiments utilize the information contained in a calendaring application to route incoming communications to a receiving party. This may lead to benefits for the sending party by allowing the communication to be sent to a destination likely to be currently monitored by the receiving party. This may also benefit the receiving party by cutting down on the number of destinations to be monitored for incoming communications.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While exemplary embodiments of the invention have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing calendar based routing of communications, the method comprising:

receiving a communication from a sending party to a receiving party, the communication including a communication type;

retrieving a current calendar entry for the receiving party in response to receiving the communication, the current calendar entry including a calendar entry type, the calendar entry type associated to the calendar entry by a calendaring system;

retrieving a list of destinations in response to retrieving a current calendar entry type for the receiving party, the destinations associated to the calendar entry type and the communication type;

determining a destination for the communication, the determining responsive to the list of destinations, the communication type and the current calendar entry type; and transmitting the communication to the destination;

where in determining a destination includes:

accessing a storage device containing information about the receiving party, the storage device including calendar entry types and communication types with corresponding target destinations;

looking up the current calendar entry type and the communication type in the storage device; and assigning the corresponding target destination to the destination.

2. The method of claim 1 further comprising determining if there is an overriding rule associated with the receiving party and the sending party, wherein if it is determined that there is an overriding rule associated with the receiving party and the sending party, then the determining a destination for the communication is responsive to the overriding rule.

3. The method of claim 2 wherein the overriding rule specifies the destination.

4. The method of claim 2 wherein the overriding rules specifies the destination based on the communication type and the sending party.

5. The method of claim 1 wherein the communication type is text.

6. The method of claim 1 wherein the communication type is voice.

7. The method of claim 1 wherein the destination is one or more of a pager, a mobile telephone, a voice mailbox, a land based telephone, an electronic-mailbox, and a user interface screen on a user device.

8. The method of claim 1 further comprising determining a notification mode associated with the current calendar entry type and the communication type, wherein the transmitting is responsive to the notification mode.

9. The method of claim 8 wherein the notification mode includes one or more of an audio alert, a haptic alert and a visual alert.

10. The method of claim 1 wherein the retrieving a current calendar entry type includes:

transmitting a request to a calendaring system, the request including an identifier of the receiving party; and receiving the current calendar entry type of the receiving party from the calendaring system in response to the request.

11. A system for providing calendar based routing of communications, the system comprising:

a processor in communication with a network; and computer-readable instructions executing on the processor for facilitating:

receiving a communication via the network from a sending party to a receiving party, the communication including a communication type;

retrieving a current calendar entry type for the receiving party in response to receiving the communication;

retrieving a list of destinations in response to retrieving a current calendar entry type for the receiving party, the destinations associated to the calendar entry type and the communication type;

determining a destination for the communication, the determining responsive to the list of destinations, the communication type and the current calendar entry type; and transmitting the communication to the destination via the network;

wherein the determining a destination includes:

accessing a storage device containing information about the receiving party, the storage device including calendar entry types and communication types with corresponding target destinations;

looking up the current calendar entry type and the communication type in the storage device; and assigning the corresponding target destination to the destination.

12. The system of claim 11 wherein the processor is located on a user device.

13. The system of claim 11 wherein the network is the Internet.

14. The system of claim 11 wherein the instructions further facilitate determining if there is an overriding rule associated with one or more of the receiving party and the sending party, wherein if it is determined that there is an overriding rule associated with the receiving party and the sending party, then the determining a destination for the communication is responsive to the overriding rule.

15. The system of claim 11 wherein the destination is one or more of a pager, a mobile telephone, a voice mailbox, a land based telephone, an electronic-mailbox, and a user interface screen on a user device.

16. The system of claim 11 wherein the instructions further facilitate determining a notification mode associated with the current calendar entry type and the communication type, wherein the transmitting is responsive to the notification mode.

17. A computer program product for providing calendar based routing of communications, the computer program product comprising:

a non-transitory storage medium readable by a processing circuit and storing instructions for execution by the processing circuit for facilitating a method comprising:

receiving a communication from a sending party to a receiving party, the communication including a communication type;

retrieving a current calendar entry for the receiving party in response to receiving the communication, the current calendar entry including a calendar entry type, the calendar entry type associated to the calendar entry by a calendaring system;

determining a destination for the communication, the determining responsive to the communication type and to the current calendar entry type; and transmitting the communication to the destination;

wherein the determining a destination includes:

accessing a storage device containing information about the receiving party, the storage device including calendar entry types and communication types with corresponding target destinations;

looking up the current calendar entry type and the communication type in the storage device; and assigning the corresponding target destination to the destination.

18. The computer program product of claim 17 wherein the instructions further facilitate determining if there is an overriding rule associated with one or more of the receiving party and the sending party, wherein if it is determined that there is an overriding rule associated with the receiving party and the sending party, then the determining a destination for the communication is responsive to the overriding rule.

19. The computer program product of claim 17 wherein the instructions further facilitate determining a notification mode associated with the current calendar entry type and the communication type, wherein the transmitting is responsive to the notification mode.

\* \* \* \* \*